(12) United States Patent
Tuan et al.

(10) Patent No.: US 9,015,023 B2
(45) Date of Patent: Apr. 21, 2015

(54) DEVICE SPECIFIC CONFIGURATION OF OPERATING VOLTAGE

(75) Inventors: Tim Tuan, San Jose, CA (US); Daniel Chung, San Ramon, CA (US); Ronald Cline, Tijeras, NM (US); Andy DeBaets, Cupertino, CA (US); Matthew H. Klein, Redwood City, CA (US)

(73) Assignee: Xilinx, Inc., San Jose, CA (US)

( * ) Notice: Subject to any disclaimer, the term of this patent is extended or adjusted under 35 U.S.C. 154(b) by 1038 days.

(21) Appl. No.: 12/774,110

(22) Filed: May 5, 2010

(65) Prior Publication Data

US 2011/0276321 A1 Nov. 10, 2011

(51) Int. Cl.
G06F 17/50 (2006.01)

(52) U.S. Cl.
CPC ........ *G06F 17/5054* (2013.01); *G06F 17/5068* (2013.01); *G06F 2217/84* (2013.01)

(58) Field of Classification Search
None
See application file for complete search history.

(56) References Cited

U.S. PATENT DOCUMENTS

| | | | |
|---|---|---|---|
| 4,698,760 A | 10/1987 | Lembach et al. | |
| 5,157,618 A | 10/1992 | Ravindra et al. | |
| 5,399,898 A | 3/1995 | Rostoker | |
| 5,448,198 A | 9/1995 | Toyoshima et al. | |
| 5,461,338 A | 10/1995 | Hirayama et al. | |
| 5,487,033 A | 1/1996 | Keeney et al. | |
| 5,504,440 A | 4/1996 | Sasaki | |
| 5,612,636 A | 3/1997 | Ko | |
| 5,654,898 A | 8/1997 | Roetcisoender et al. | |
| 5,661,685 A | 8/1997 | Lee et al. | |
| 5,682,062 A | 10/1997 | Gaul | |
| 5,703,522 A | 12/1997 | Arimoto et al. | |
| 5,742,178 A | 4/1998 | Jenkins, IV et al. | |
| 5,787,011 A | 7/1998 | Ko | |
| 5,808,479 A | 9/1998 | Sasaki et al. | |
| 5,811,985 A | 9/1998 | Trimberger et al. | |
| 5,815,004 A | 9/1998 | Trimberger et al. | |
| 5,825,707 A | 10/1998 | Nozawa et al. | |

(Continued)

FOREIGN PATENT DOCUMENTS

| | | |
|---|---|---|
| JP | 11-122047 | 4/1999 |
| JP | 2001015603 | 1/2001 |

(Continued)

OTHER PUBLICATIONS

Betz, Vaughn et al.; "FPGA Routing Architecture: Segmentation and Buffering to Optimize Speed and Density"; ACM/SIGDA International Symposium on Field Programmable Gate Arrays; FPGA 99; Feb. 21-23, 1999; pp. 59-68.

(Continued)

*Primary Examiner* — Hugh Jones
*Assistant Examiner* — Nithya J Moll
(74) *Attorney, Agent, or Firm* — LeRoy D. Maunu

(57) ABSTRACT

A method and circuit for device specific configuration of an operating voltage is provided. A circuit design is analyzed to determine a maximum gate-level delay for the circuit design. A minimum voltage value corresponding to the maximum gate-level delay is determined along with a default voltage value corresponding to a default gate-level delay. A voltage scaling factor corresponding to the minimum voltage and default voltage values is determined. The circuit design is synthesized such that the synthesized design includes the voltage scaling value. The synthesized design specifies setting an operating voltage to a value of a startup voltage value scaled by the voltage scaling value.

13 Claims, 8 Drawing Sheets

(56) References Cited

U.S. PATENT DOCUMENTS

| | | | |
|---|---|---|---|
| 5,880,598 | A | 3/1999 | Duong |
| 5,880,620 | A | 3/1999 | Gitlin et al. |
| 5,880,967 | A | 3/1999 | Jyu et al. |
| 5,892,961 | A | 4/1999 | Trimberger |
| 5,914,616 | A | 6/1999 | Young et al. |
| 5,917,709 | A | 6/1999 | Johnson et al. |
| 5,984,510 | A | 11/1999 | Guruswamy et al. |
| 5,995,379 | A | 11/1999 | Kyougoku et al. |
| 6,097,113 | A | 8/2000 | Teraoka et al. |
| 6,150,724 | A | 11/2000 | Wenzel et al. |
| 6,163,168 | A | 12/2000 | Nguyen et al. |
| 6,178,542 | B1 | 1/2001 | Dave |
| 6,269,458 | B1 | 7/2001 | Jeter et al. |
| 6,272,668 | B1 | 8/2001 | Teene |
| 6,348,813 | B1 | 2/2002 | Agrawal et al. |
| 6,362,649 | B1 | 3/2002 | McGowan |
| 6,369,630 | B1 | 4/2002 | Rockett |
| 6,448,808 | B2 | 9/2002 | Young et al. |
| 6,505,322 | B2 | 1/2003 | Yamashita et al. |
| 6,539,536 | B1 | 3/2003 | Singh et al. |
| 6,577,013 | B1 | 6/2003 | Glenn et al. |
| 6,583,645 | B1 | 6/2003 | Bennett et al. |
| 6,590,419 | B1 | 7/2003 | Betz et al. |
| 6,604,228 | B1 | 8/2003 | Patel et al. |
| 6,621,325 | B2 | 9/2003 | Gitlin et al. |
| 6,630,838 | B1 | 10/2003 | Wong |
| 6,721,924 | B2 | 4/2004 | Patra et al. |
| 6,777,978 | B2 | 8/2004 | Hart et al. |
| 6,882,045 | B2 | 4/2005 | Massingill et al. |
| 6,903,443 | B2 | 6/2005 | Farnworth et al. |
| 6,930,510 | B2 | 8/2005 | New |
| 6,950,998 | B1 | 9/2005 | Tuan |
| 7,068,072 | B2 | 6/2006 | New et al. |
| 7,089,527 | B2 | 8/2006 | Hart et al. |
| 7,138,828 | B2 | 11/2006 | New |
| 7,276,799 | B2 | 10/2007 | Lee et al. |
| 7,323,771 | B2 | 1/2008 | Fujita et al. |
| 7,337,100 | B1 * | 2/2008 | Hutton et al. .................. 703/13 |
| 7,367,503 | B2 | 5/2008 | Harai et al. |
| 7,412,668 | B1 | 8/2008 | Duong |
| 7,435,910 | B2 | 10/2008 | Sakamoto et al. |
| 7,466,028 | B1 | 12/2008 | Yu et al. |
| 7,493,247 | B2 * | 2/2009 | Memmi .......................... 703/14 |
| 7,509,608 | B1 * | 3/2009 | Duong ........................... 716/113 |
| 7,518,398 | B1 | 4/2009 | Rahman et al. |
| 7,538,033 | B2 | 5/2009 | Trezza |
| 7,557,367 | B2 | 7/2009 | Rogers et al. |
| 7,605,458 | B1 | 10/2009 | Rahman et al. |
| 7,619,441 | B1 | 11/2009 | Rahman et al. |
| 7,765,686 | B2 | 8/2010 | Murakami et al. |
| 7,838,997 | B2 | 11/2010 | Trezza |
| 7,904,864 | B2 | 3/2011 | Huynh et al. |
| 7,989,959 | B1 | 8/2011 | Rahman |
| 8,082,537 | B1 | 12/2011 | Rahman |
| 8,390,035 | B2 | 3/2013 | Bemanian et al. |
| 8,692,561 | B2 | 4/2014 | Cordero et al. |
| 2001/0048319 | A1 | 12/2001 | Miyazaki et al. |
| 2002/0069396 | A1 | 6/2002 | Bhattacharya et al. |
| 2002/0139577 | A1 | 10/2002 | Miller |
| 2003/0066037 | A1 * | 4/2003 | Patra et al. ..................... 716/2 |
| 2004/0061238 | A1 | 4/2004 | Sekine |
| 2006/0113598 | A1 | 6/2006 | Chen et al. |
| 2008/0150088 | A1 | 6/2008 | Reed et al. |
| 2008/0178023 | A1 | 7/2008 | Kim et al. |
| 2008/0244278 | A1 * | 10/2008 | Monferrer et al. ............ 713/300 |
| 2009/0020855 | A1 | 1/2009 | Pyeon |
| 2009/0230552 | A1 | 9/2009 | Pendse |
| 2009/0281772 | A1 * | 11/2009 | Jamann et al. .................. 703/1 |
| 2009/0315627 | A1 | 12/2009 | Bereza et al. |
| 2009/0319968 | A1 | 12/2009 | Wang et al. |
| 2009/0321947 | A1 | 12/2009 | Pratt |
| 2010/0259296 | A1 | 10/2010 | Or-Bach |
| 2010/0270597 | A1 | 10/2010 | Sproch et al. |
| 2010/0289124 | A1 | 11/2010 | Nuzzo et al. |
| 2011/0018573 | A1 | 1/2011 | Hamada et al. |
| 2011/0036396 | A1 | 2/2011 | Jayaraman et al. |
| 2011/0131427 | A1 | 6/2011 | Jorgenson et al. |
| 2011/0276321 | A1 | 11/2011 | Tuan et al. |

FOREIGN PATENT DOCUMENTS

| | | |
|---|---|---|
| JP | 2001-068606 | 3/2001 |
| JP | 11-195976 | 7/2005 |
| JP | 2005-339052 | 12/2005 |
| JP | 2007-053761 | 3/2007 |
| JP | 2009-237972 | 10/2009 |
| WO | WO 00/52826 A | 9/2000 |
| WO | WO 01/28097 A | 4/2001 |

OTHER PUBLICATIONS

Wang, Ping-Tsung et al.; "A Hierarchical Interconnection Structure for Field-Programmable Gate Arrays"; Institute of Electrical and Electronics Engineers; Proceedings of the Region Ten Conference; Oct. 19-21, 1993; vol. 3; pp. 557-560.

Dobbelaere, Ivo et al.; "Regenerative Feedback Repeaters for Programmable Interconnections"; IEEE Journal of Solid-State Circuits, IEEE Inc.; vol. 30, No. 11; Nov. 1, 1995; pp. 1246-1253.

Xilinx, Inc.; "Virtex-II Platform FPGA Handbook"; published Dec. 6, 2000; available from Xilinx, Inc., 2100 Logic Drive, San Jose, California 95124; pp. 33-75.

Hutton, M. et al.; "Interconnect Enhancements for a High-Speed PLD Architecture"; Feb. 24-26, 2002; available from Altera Corporation, 101 Innovation Drive, San Jose, California 95134; 8 pages.

Nose, K. et al.; "VTH—hopping Scheme for 82% Power Saving in Low-Voltage Processors"; Proceedings of the IEEE 2001 Custom Integrated Circuits Conference; May 6-9, 2001; pp. 93-96.

Kuroda, T. et al.; "A 0.9 V 150 MHz 10 mW 4 mm2-D Discrete Cosine Transform Core Processor with Variable-Threshold-Voltage Scheme"; Solid-State Circuits Conference; 1996; Digest of Technical Papers; $42^{nd}$ ISSCC; IEEE International; Feb. 8, 1996; pp. 166-167, 437.

Kuroda, T. et al.; "A High-Speed Low-Power 0.3/sp1 mu/m CMOS Gate Array with Variable Threshold Voltage (VT) Scheme"; Custom Integrated Circuits Conference; 1996; Proceedings of the IEEE 1996; May 5-8, 1996; pp. 53-56.

Chow, C.T. et al., "Dynamic Voltage Scaling for Commercial FPGAs", Field-Programmable Technology 2005, Proceedings, 2005 IEEE International NAL Conference on Singapore, China, Dec. 11-14, 2005, pp. 173-180, Piscataway, NJ, USA.

Lin, Yan et al., "Circuit and Architectures for Field Programmable Gate Array with Configurable Supply Voltage", IEEE Transactions on Very Large Scale Integration (VLSI) Systems, vol. 13, No. 9, Sep. 1, 2005, pp. 1035-1047.

U.S. Appl. No. 12/392,065, filed Feb. 24, 2009, Rahman.

U.S. Appl. No. 13/866,893, filed Apr. 19, 2013, Vo.

Nakahira H. et al., "A Lean Power Management Technique: The Lowest power consumption for the given operating speed of LSIs", Technical Report of IEICE, ICD, Integrated Circuit, Japan, the Institute of Electronics, Information and communication Engineers, Jun. 19, 1997, vol. 97, No. 110, pp. 51-58.

\* cited by examiner

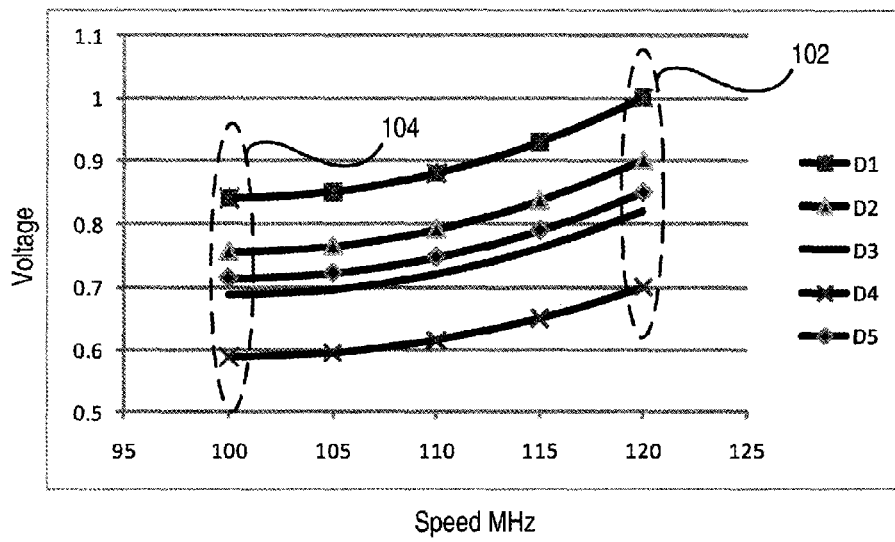
FIG. 1-1
FIG. 1-2
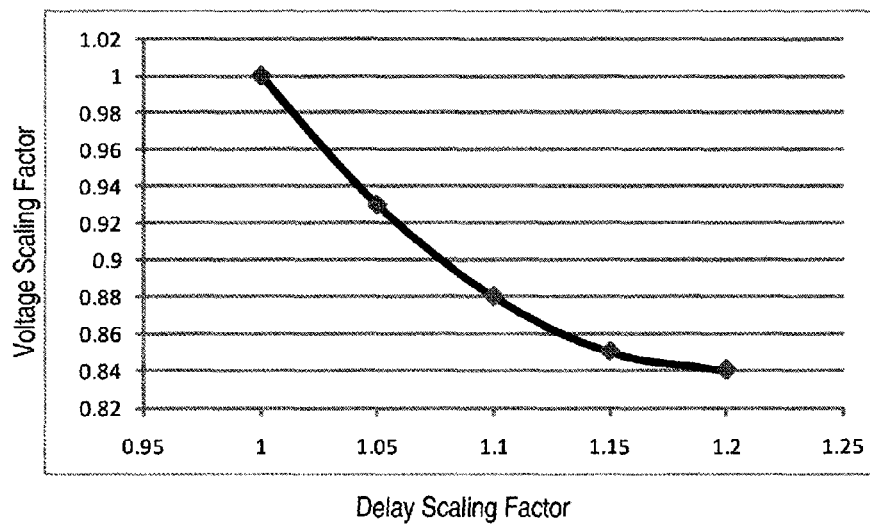
FIG. 1-3

DEVICE SPECIFIC CONFIGURATION OF OPERATING VOLTAGE

FIELD OF THE INVENTION

An embodiment of the present invention generally relates to integrated circuits, and more particularly programmable voltage of integrated circuits.

BACKGROUND

The minimum dimension that a given photolithography process can resolve is alternatively called the minimum feature-size or the critical dimension. The feature-size is a parameter of interest as reductions in the feature-size tend to improve speed performance of the IC. The feature-size of a printed integrated circuit (IC) is not uniform. The printing process results in slight variation of the feature-size from lot-to-lot, from wafer-to wafer, and from device to device within each wafer. As a result, programmable ICs, such as field programmable gate arrays (FPGAs) vary in static power and circuit delay due to variations in the manufacturing process. Slow devices usually have lower static power and fast devices usually have higher static power requirements.

As circuit designs continue to increase the speed and power efficiency requirements of target devices, it becomes increasingly important for developers to simulate and test circuit designs on target devices using precise power and delay specifications prior to realization. Many programmable IC vendors, such as Xilinx, Inc., measure switching speed of several printed devices of a product design to determine a minimum operating voltage and maximum delay that can be guaranteed to designers.

Due to variations from device to device, in order for the guaranteed specifications to apply to a majority of the printed devices, the guaranteed voltage and delay specifications are offset to include a certain amount of headroom. For example, measurements may indicate that the majority of product devices can operate on average at or above 110 megahertz (MHz) at 1V operating voltage but a small percentage of the devices will operate as low as 102 MHz at the same voltage. The specification may offset average speed of 110 by a headroom of 10 MHz to ensure devices perform as indicated in the specification. The presence of process variations degrade the performance and power specifications that manufactures can guarantee to customers. The larger the amount of variation, the larger the specification is offset by a headroom. Because of the included headroom, many printed devices in a product design are capable of performing with better voltage and delay parameters than that guaranteed in the vendor product specification.

One or more embodiments of the present invention may address one or more of the above issues.

SUMMARY

In one embodiment of the present invention, a method for synthesis of a circuit design is provided. Delay-voltage data that describes a plurality of delay values is input. The delay values correspond to operating voltage values of a target device. The circuit design is analyzed to determine, by a processor, a maximum gate-level delay for the circuit design. A minimum voltage value corresponding to the maximum gate-level delay is determined along with a default voltage value corresponding to a default gate-level delay. A voltage scaling factor corresponding to the minimum voltage and default voltage values is determined. The circuit design is synthesized such that the synthesized design includes the voltage scaling value. The synthesized design specifies setting an operating voltage to a value of a startup voltage value scaled by the voltage scaling value. The startup voltage value is a value stored in the target device for implementing the synthesized circuit design.

In another embodiment of the present invention, a programmable integrated circuit is provided. The programmable integrated circuit includes a plurality of programmable resources and a plurality of programmable routing resources for coupling the programmable resources. A plurality of configuration memory cells are coupled to the programmable resource and to the programmable routing resources. The programmable integrated circuit also includes a non-volatile memory unit and a power controller unit coupled to the non-volatile memory unit. The power controller unit is coupled and configured to set the operating voltage to a minimum value stored in the non-volatile memory unit.

In yet another embodiment, a method for synthesis of a circuit design is provided. Delay-voltage data that describes a plurality of delay values corresponding to operating voltage values of a target device is input. A maximum gate-level delay for the circuit design is determined by a processor from analysis of the circuit design. The one of the operating voltage values corresponding to one of plurality of delay values that is equivalent to the determined maximum gate-level delay is determined. The circuit design is synthesized such that the synthesized design specifies storing a voltage scaling value in a non-volatile memory. The synthesized design further specifies setting an operating voltage of a realized circuit of the synthesized design to a value of the one operating voltage value.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which:

FIG. 1-1 shows a graph of voltage versus clock speed for five example devices;

FIG. 1-2 shows an example table of voltage scaling factors and corresponding delay scaling factors;

FIG. 1-3 shows a graph of an equation representing the table shown in FIG. 1-2;

FIG. 2 shows a graph of power v. delay of five devices after voltage scaling;

FIG. 3 shows a flowchart of a process to determine the voltage scaling factor for a target device;

FIG. 4-1 shows a block diagram of a programmable integrated circuit configured with a power controller and coupled to an external programmable power supply in accordance with various embodiments of the invention;

FIG. 4-2 shows a block diagram of a programmable integrated circuit configured with a power controller and internal power regulator in accordance with various embodiments of the invention;

DETAILED DESCRIPTION OF THE DRAWINGS

The various embodiments of this disclosure provide methods of using programmable voltage to improve power delay variation in integrated circuits. Due to variation in the lithography process of integrated circuit manufacture, different devices of the same design require different voltages to achieve the same gate switching speed. Faster devices can meet a specified timing requirement with lower voltages, and slower devices can be sped up to achieve the specified timing requirement with a higher voltage. Reducing the variance of power and delay distributions can improve both power and delay specifications of a product design.

In one embodiment of the invention, each device is tested to determine a minimum operating voltage (Vmin) for a nominal delay indicated in the product specification. This voltage is stored in a non-volatile memory on the die. Vmin can then be used to signal a programmable power supply to set the operating voltage of the device to Vmin.

Figures 1, 4:
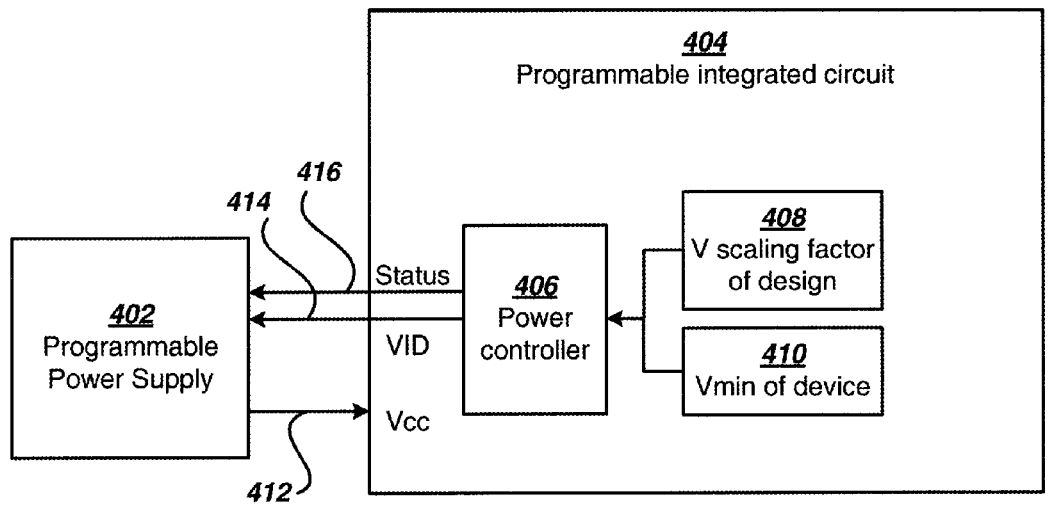
Figures 2, 4:
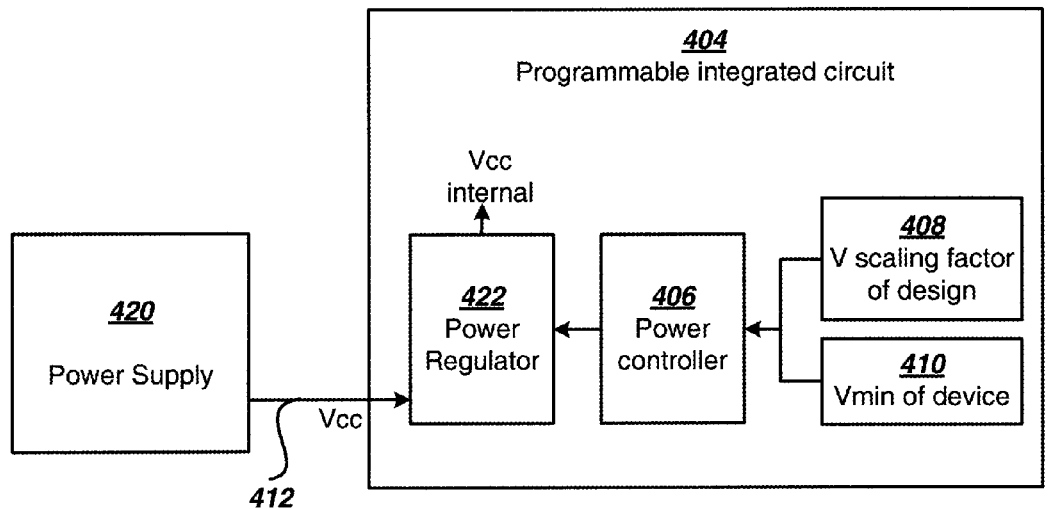

For example, FIG. 1-1 shows a graph of voltage v. speed performance for five hypothetical devices cut from the same wafer. Each device can operate at a slightly different speed at a given operating voltage due to variation in the printing of the devices. A device specification from the manufacturer may indicate that 120 megahertz (MHz) operation can be guaranteed at an operating voltage of 1.0 volts. This would ensure that at 1.0 volts, all devices sold by the manufacturer would perform as specified. However, four of the devices can operate at 120 MHz under lower operating voltages 102. By measuring each device to determine the minimum operating voltage for a speed that will be indicated in the specification, the determined minimum operating voltage can be stored in non-volatile memory of each device and used to set the operating voltage at startup.

To efficiently determine Vmin for each realized device, a different final test flow is employed in a manufacturing test. Special speed testing is placed towards the beginning of the test flow after some gross open/short and gross defect testing. These special speed tests are performed at different voltage levels between typical specification and minimum guaranteed level. The lowest voltage level necessary for all tested devices to pass the requirements that will be used in the product specification is recorded. A functional testing voltage level at which the device can achieve required speed is determined. The device is then tested at the functional test voltage level to guarantee functionality at the programmed Vmin level. It is understood that each device need not be measured individually. Several devices cut from the same wafer can be used to generalize the minimum voltage of the wafer. Each wafer could also be divided into regions and several devices cut from the same region can be used to generalize the minimum voltage of the wafer.

In one embodiment, further testing can be performed on several of the printed devices to determine a common scaling between a first set of minimum voltages necessary to operate each device at a first speed and a second set of minimum voltages necessary to operate each device at a second speed. Several common scaling factors of a minimum voltage may be provided in a device specification to indicate voltages necessary to operate devices at several different operating speeds. Because the scaling is common, the same scaling factor can be used with the Vmin stored on several devices to determine the scaled operating voltage necessary to operate each device at a certain operating speed.

For example, the graph in FIG. 1-1 shows the voltage required for five devices at several clock speeds. A common scaling factor can be determined to scale the voltage necessary to operate at 120 MHz 102 to a voltage necessary to operate at 100 MHz 104. In this example the voltage of a device necessary to operate at 100 MHz ($V_{100MHz}$) is given by the equation, $$V_{100MHz} = V_{scale100} * V_{120MHz}$$

where $V_{120MHz}$ is the operating voltage of the device necessary to operate at 120 MHz and $V_{scale100}$ is a scaling factor to scale between the two operating speeds. In this example, the common scaling between devices is a linear equation. It will be recognized that some product designs may require a non-linear equation to represent a common scaling of an operating speed.

By including several scaling factors in a device specification, automated design tools can be used by a designer to program a desired one of those scaling factors into a synthesized design or bitstream. When the design is printed or programmed onto programmable logic, the scaling factor can be read at startup along with a minimum voltage value stored in nonvolatile memory. The scaling factor can scale the stored minimum voltage value to achieve a voltage level corresponding to a desired operating speed. In this manner, designers can determine a needed operating speed for their design and configure their design to operate at the minimum necessary voltage to achieve the required operating speed.

The scaling factor may be stored in non-volatile memory internal or external to the device. For example, if the scaling factor is stored in the bitstream of an FPGA, the bitstream may be stored in internal or external non-volatile memory prior to device configuration at startup.

The scaling factor may not necessarily be linear. For example, in FIG. 1-1 the scaling factor to scale from 120 MHz to 115 MHz may be different from the scaling factor to scale from 115 MHz to 110 MHz. When a voltage scaling factor is used in conjuncture with a Vmin stored on a device, Vmin of each device should correspond to one operating speed. In this manner, the same scaling factor can be used to scale Vmin of each device. Likewise, the scaling factor programmed into the bitstream used should scale the voltage of the one operating speed to a voltage necessary to operate the device at a designed operating speed.

Figure 2:
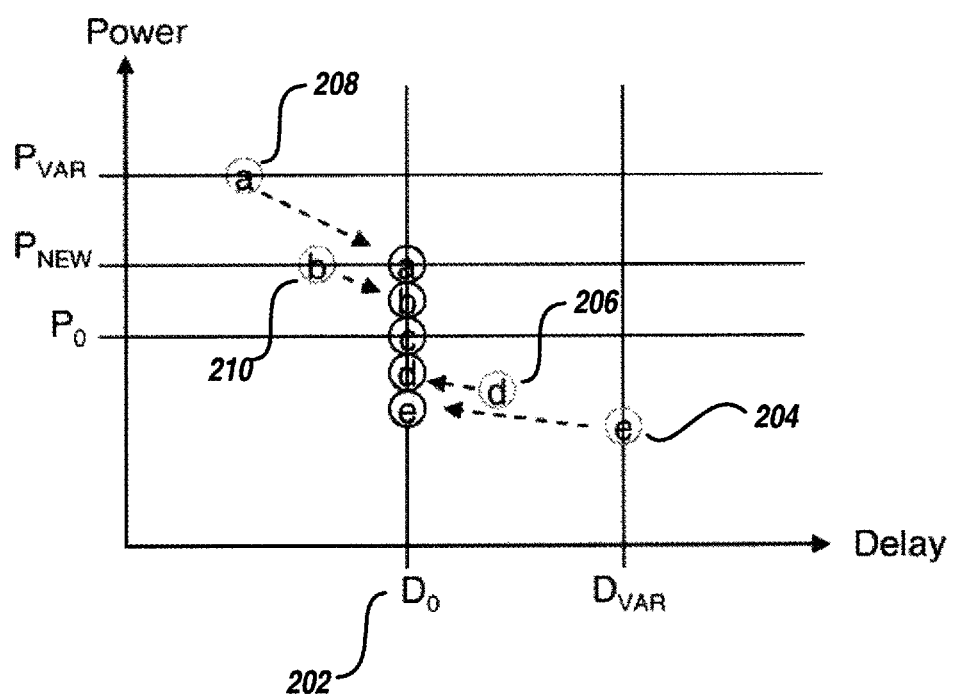
Figure 3:
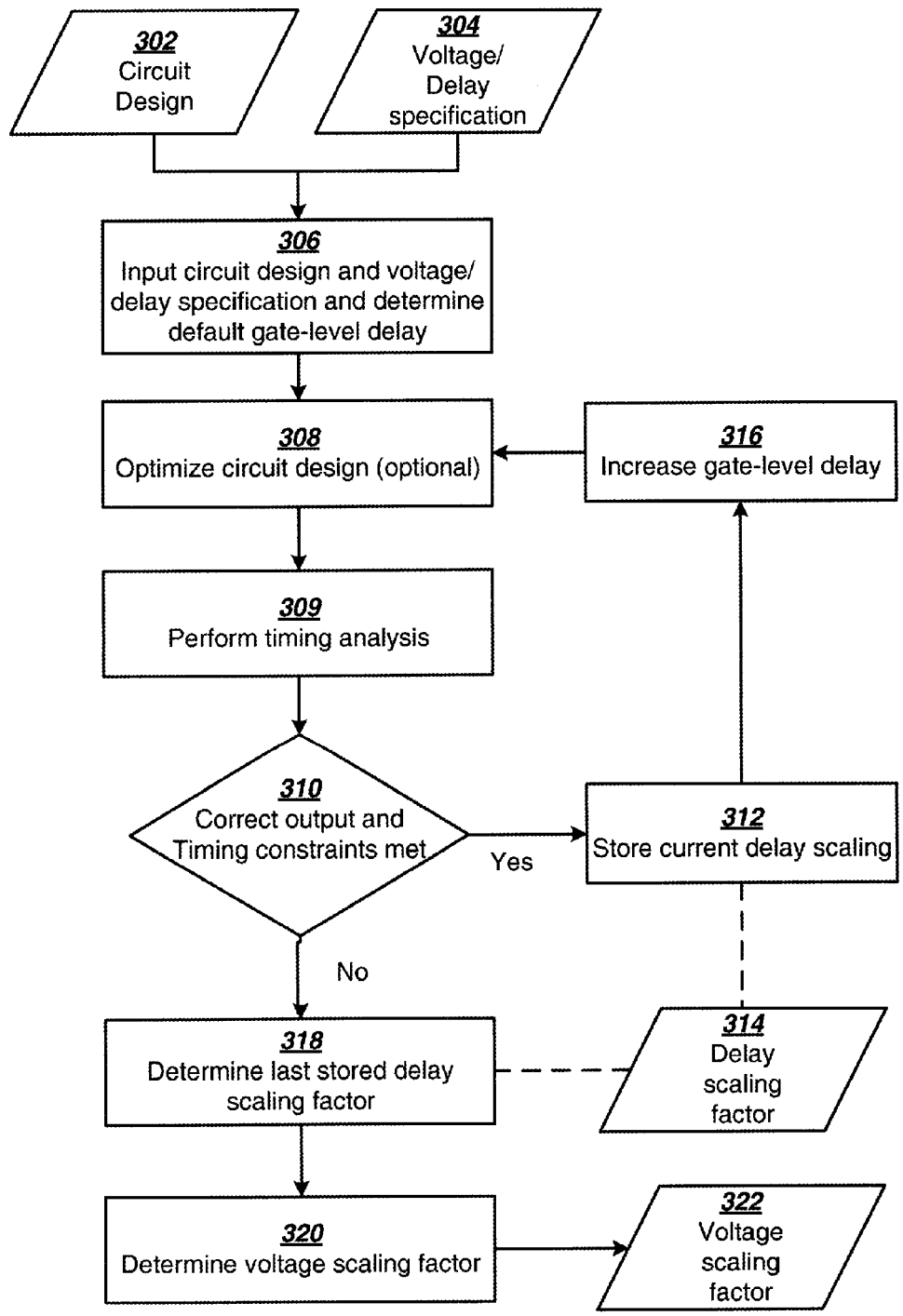

To enable designers to operate a device at optimal voltages at different operating speeds, several scaling factors can be included in a device specification. FIG. 1-2 shows a table of voltage scaling factors and corresponding delay scaling factors to scale the 120 MHz voltages 102 in FIG. 1-1 to voltages at the other operating speeds shown. The delay scaling factor (Vdelay) scales the delay at one voltage to the delay at another voltage. In addition to, or in lieu of, the scaling factor table shown in FIG. 1-2, an equation to convert a delay scaling factor to a voltage scaling factor can be included in a device specification. For example, FIG. 1-3 shows a graph of the equation $4(Vdelay)^2 - 9(Vdelay) + 6.6$ which can be used to calculate the voltage scaling factors for delay scaling factors not included in the table shown in FIG. 1-2.

Voltage scaling can be used to reduce the voltage to reduce power consumption or used to increase the voltage to improve performance. FIG. 2 shows a power versus delay distribution of five tested devices operating at a nominal voltage. Devices a 208 and b 210 can be slowed down by operating at voltages lower than the nominal voltage. Devices d 206 and e 204 are sped up by operating at voltages higher than nominal voltage. As a result all devices operate at a delay of D0 202. Consequently, the timing specification is improved from Dvar to D0, and the power specification is improved from Pvar to Pnew. It should be noted that in scaling voltages of devices, low voltage may affect the functionality of the device and high voltages may adversely affect reliability. A product specification may include a safe operating voltage range to ensure that the operating voltage is not scaled outside a safe operating range.

In some embodiments, software design tools may be used to determine whether a target device can operate at reduced voltages based on various user constraints such as a maximum operating speed, maximum operating voltage, etc. If the design tools determine that the user constraints can be met through voltage scaling, an appropriate voltage scaling factor is determined and programmed into the bitstream or otherwise incorporated into the realized circuit design.

Software design tools can be used to determine a maximum delay that produces correct output for a specific circuit design. For example, the design tools may analyze a circuit design and determine that the specified timing constraints can be met even if delay parameters are 1% lower than indicated in the specification. The tools may determine that a delay scaling factor of 1.1 corresponds to a voltage scaling factor of 0.88 using the example table shown in FIG. 1-2. The voltage scaling factor of 0.88 can be stored in the bitstream of the synthesized circuit design and used along with the minimum voltage stored in non-volatile memory to set the operating voltage of a programmable power supply when the device is powered on.

In one embodiment, a timing analysis is iteratively performed on the circuit design. In each iteration, the delay parameters in the delay specification of the target device are derated by an incrementally increasing scaling factor. The iterating stops when the design fails to meet the timing constraints. The last delay scaling factor that meets the timing constraints is used as the delay scaling factor.

FIG. 3 shows a flowchart of an example process for determining a voltage scaling factor for a specific circuit design. A circuit design 302 and a voltage/delay specification 304 are received at step 306. The voltage/delay specification 304 corresponds to a target device that will be used to realize circuit design 302. A default gate level delay is determined for the target device from the voltage/delay specification 304 at step 306. The default gate level delay corresponds to the Vmin operating voltage programmed on the target device. For example, the maximum guaranteed delay indicated at a nominal voltage in the specification may be used as the default gate level delay. Timing analysis is performed at step 309 to determine the performance and functionality of the circuit design 302 with the set gate level delay.

In some embodiments of the present invention, optimizations may be performed at step 308 to improve functionality and performance of the circuit. For example, the circuit design may be re-mapped, re-placed, and/or re-routed to improve throughput or meet timing constraints of the circuit design. In addition to producing functionally correct output, timing and design constraints may include a number of user defined limitations, such as a specific operating voltage, a specific voltage scaling factor, a specific gate level delay, a specific operating frequency of the target device, etc.

If the circuit design is determined to produce correct output and timing and/or design constraints are met at decision step 310, the current gate level delay or a scaling factor of the default gate level delay is stored at step 312. The gate level delay is increased at step 316 and timing analysis is performed on circuit design at step 309. The circuit design may also be further optimized at step 308. This process is repeated until circuit design 302 is determined to produce incorrect output or fails to meet the timing and/or design constraints at decision step 310.

After the circuit design 302 fails to produce correct output or meet design/timing constraints, the most recent stored delay, corresponding to the largest functional gate level delay, is retrieved at step 318. The delay scaling factor is converted to a voltage scaling factor 322 and output at step 320. The mapping of delay scaling factor to voltage scaling factor can be determined by characterizing FPGA delay parameters at multiple voltages and provided in a table or equation as discussed above. In some other embodiments of the invention, a voltage scaling factor for a specific circuit design and target device can be determined by iteratively simulating the circuit design on a model of the target device using incrementally decreasing operating voltage levels. In each iteration, the simulation can simulate the latching speed of transistors of the target device for the current voltage level. The iterating stops when the design fails to meet the timing or design constraints. The last operating voltage level where the design meets the timing and design constraints is used as the operating voltage of the device. Once a voltage scaling factor is determined, a bitstream of the design including a specific voltage or a voltage scaling factor may be generated and loaded onto a target device.

In another embodiment, the user can request the design tools to produce a design with sufficient performance headroom to allow the operating voltage to be scaled by a certain voltage scaling factor. Alternatively, the user may request a precise operating voltage. The tool determines the necessary delay scaling factor using the example mapping table in FIG. 1-2 and runs the timing-driven implementation flow using a nominal voltage indicated in the specification where the delay parameters are derated by the delay scaling factor. If the tools succeed in meeting the timing constraints, then the resulting design will be able to operate under a voltage scaling factor (or actual voltage) requested by the user. The power controller would signal a programmable power supply to set the operating voltage at Vmin scaled by the voltage scaling factor.

For example, the user may ask the tools to produce a Virtex-5 design that can operate at 0.88V (or scaling factor of 0.88). The tool determines that the design must operate with a timing delay indicated in the specification derated by a delay scaling factor of 1.10. The tools run a timing-driven flow using delay parameters indicated in the specification that are adjusted by 1.10. When successful, the resulting design can meet timing at 0.88V. If Vmin is used, the power controller sets each part at 0.88*Vmin. If Vmin is not used, the power controller sets each part at a fixed voltage of 0.88V.

In some embodiments, Vmin is not used or may not be stored on the target device. In these embodiments, a specific operating voltage may be programmed into the bitstream. Alternatively, a scaling factor to scale the nominal voltage indicated in the product specification can be determined. The specific scaling factor meeting defined user constraints can be determined using the methods discussed above. The determined scaling factor is then programmed into a bitstream and loaded onto a target device. When the target device is powered on, a power controller circuit can simply set the supply voltage at nominal voltage scaled by the voltage scaling factor.

FIG. 4-1 shows a block diagram of a target device equipped with programmable voltage control. On the integrated circuit device 404, information about the part's minimum supply voltage (Vmin) is stored in nonvolatile memory 410. When the device is activated, Vmin 410 is retrieved by power controller 406 and is used to configure the device to a default operating voltage. To set the operating voltage to the Vmin value, power controller 406 sends a voltage identification code (VID) 414 corresponding to the target operating voltage to power supply 402. Power supply 402 in turn powers the integrated circuit at a voltage that corresponds to the received VID.

In one embodiment, the power controller also sends a status signal 416 to the power supply to indicate when the VID signals are valid. Depending on the state of the status signal, the power supply outputs either a fixed nominal voltage, or the VID voltage, to Vcc input 412. This may be useful when the target device is an FPGA. In some embodiments, the initial voltage can be set using pull-up and pull-down resistors to set a valid VID before the FPGA is configured.

In another embodiment of the present invention, the target device may include an operating voltage regulator to set or adjust the desired operating voltage of the target device internally in lieu of a programmable power supply. FIG. 4-2 shows a block diagram of a target device equipped with an internal power regulator. Information about the part's minimum supply voltage (Vmin) is stored in nonvolatile memory 410 on the integrated circuit device 404. Power supply 420 is configured to output a fixed nominal voltage to Vcc input 412. When the device is activated, power regulator 422 outputs a Vcc internal voltage that is used to power logic contained in target device 404. Power controller 406 is configured to retrieve Vmin 410 and Voltage scaling factor 408, determine an operating voltage and signal power regulator 422 to output the determined operating voltage.

Figure 5:
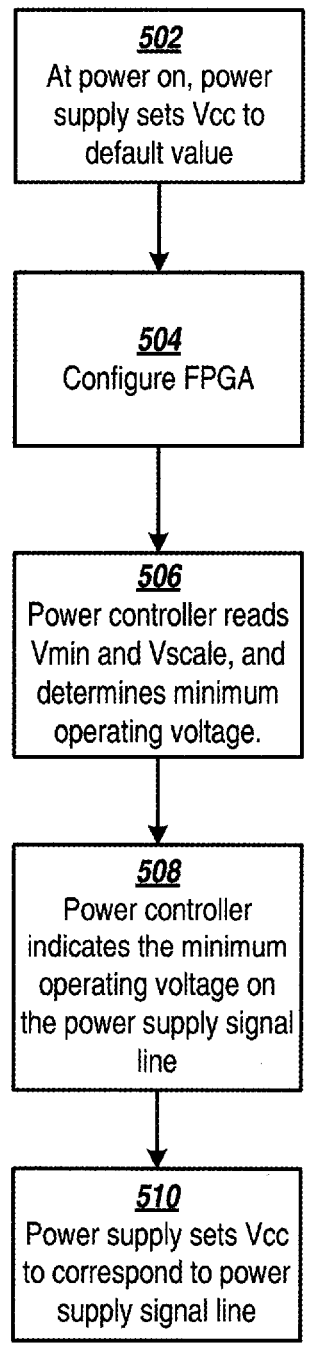
FIG. 5 shows a flowchart of a process in which a target device configured with a power controller may adjust voltage in accordance with several embodiments of the invention.

FIG. 5 shows a flowchart of an example process in which a target FPGA device having a power controller implemented in programmable logic may adjust voltage in accordance with several embodiments of the invention. The target device is powered on at step 502, and the power supply sets Vcc to an initial default nominal value. This voltage may either be set by pull-up and pull-down resistors or be preset to respond to the status signal. If the status signal is used, it must be valid before the FPGA is configured. The FPGA programmable logic is configured at step 504. After configuration of the FPGA, power controller 506 reads Vmin and/or Vscale from nonvolatile memory at step 506 and determines a minimum operating voltage for the target device. The power controller indicates the minimum operating voltage to the programmable power supply using a valid VID at step 508. The power supply sets Vcc to the voltage indicated in the VID at step 510.

The various embodiments, may implement a circuit design on a number of target devices. It is understood that the target device may be an application specific integrated circuit (ASIC) or a programmable logic integrated circuit such as an FPGA. If the target device implements programmable logic, the power control logic may be implemented in dedicated hardware or in programmable logic. If a status signal is not used to signal the programmable power supply, the power controller may be a dedicated hardware or a programmable logic. However, if the status signal is used to set the initial voltage before an FPGA is configured, the power controller should be a dedicated hardware so that it is active before the device is configured. The power controller can then set the status signal to indicate to the power supply that the FPGA has been configured and VID is now valid. If a status signal is not used, then this step may be skipped.

Figure 6:
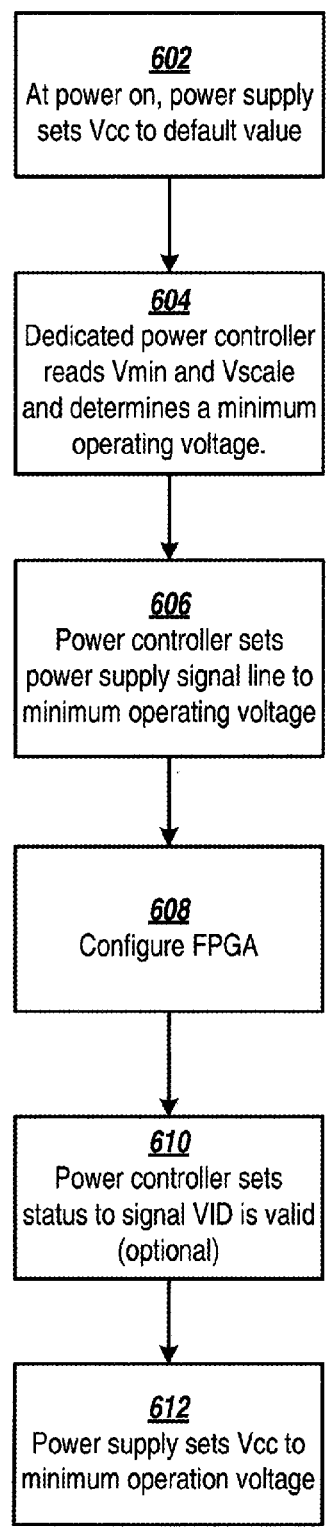
FIG. 6 shows a flowchart of a process in which a target device configured with a power controller implemented in dedicated hardware may adjust voltage in accordance with several embodiments of the invention.

FIG. 6 shows a flowchart of an example process in which a target FPGA device having a power controller implemented in dedicated hardware may adjust voltage in accordance with several embodiments of the invention. The target device is powered on at step 602 and the power supply sets Vcc to an initial default nominal value. A dedicated power controller reads Vmin from non-volatile memory and Vscale from configuration memory at step 604 and determines a minimum operating voltage. The power controller sets power supply signal line to the minimum operating voltage Vmin at step 606. The FPGA is configured at step 608. The Power controller sets status to signal VID is valid at step 610. Power supply sets Vcc to the minimum operating voltage at step 612.

Figure 7:
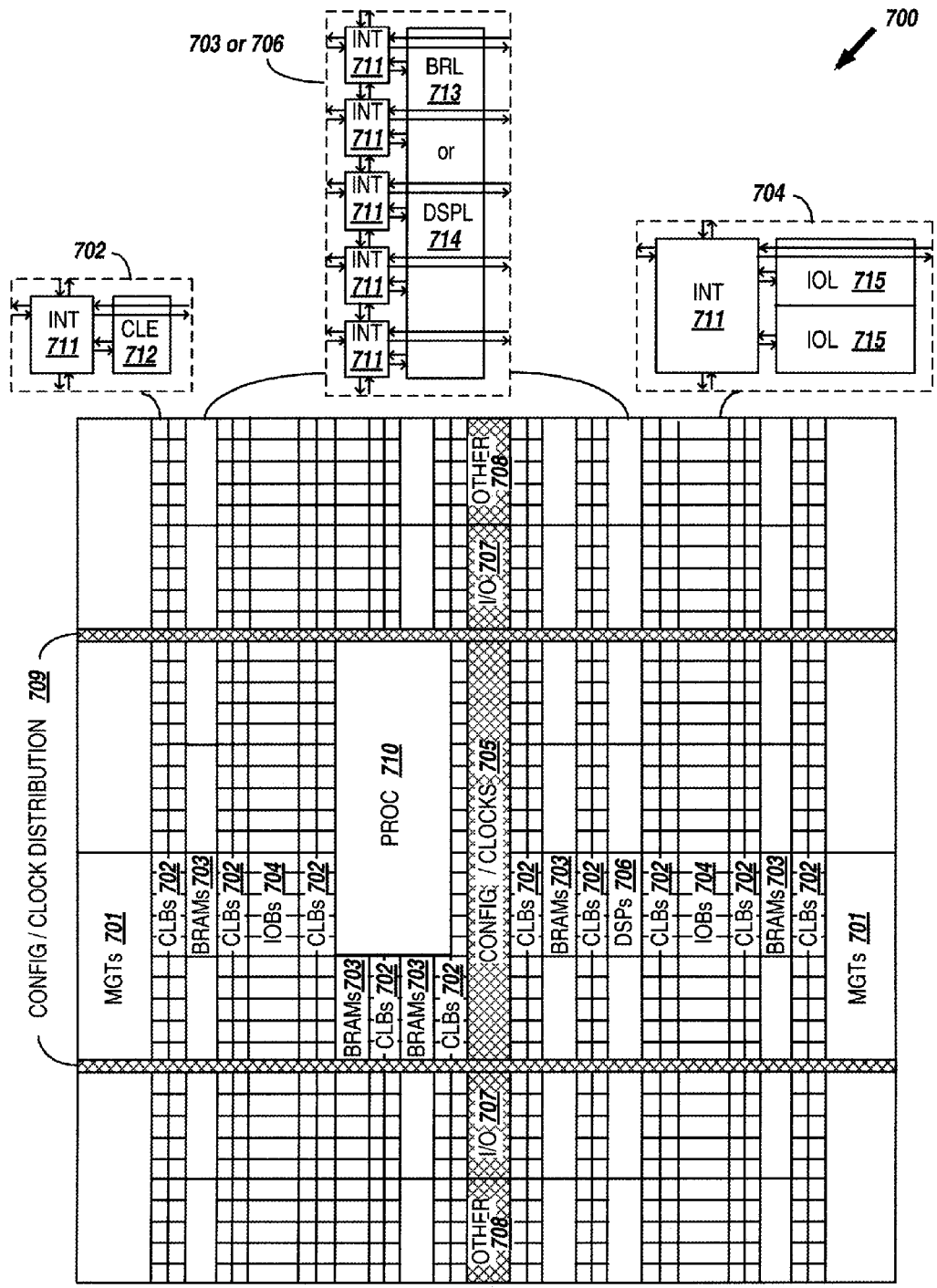
FIG. 7 illustrates a block diagram of a programmable integrated circuit for implementing a circuit design with programmable operating voltage in accordance with various embodiments of the invention.

FIG. 7 is a block diagram of an example programmable integrated circuit that may be used in implementing a circuit design with programmable operating voltage in accordance with various embodiments of the invention. A power controller, as previously described, may be implemented on the programmable logic and interconnect resources of programmable integrated circuit.

FPGAs can include several different types of programmable logic blocks in the array. For example, FIG. 7 illustrates an FPGA architecture (700) that includes a large number of different programmable tiles including multi-gigabit transceivers (MGTs 701), configurable logic blocks (CLBs 702), random access memory blocks (BRAMs 703), input/output blocks (IOBs 704), configuration and clocking logic (CONFIG/CLOCKS 705), digital signal processing blocks (DSPs 706), specialized input/output blocks (I/O 707), for example, e.g., clock ports, and other programmable logic 708 such as digital clock managers, analog-to-digital converters, system monitoring logic, and so forth. Some FPGAs also include dedicated processor blocks (PROC 710) and internal and external reconfiguration ports (not shown).

In some FPGAs, each programmable tile includes a programmable interconnect element (INT 711) having standardized connections to and from a corresponding interconnect element in each adjacent tile. Therefore, the programmable interconnect elements taken together implement the programmable interconnect structure for the illustrated FPGA. The programmable interconnect element INT 711 also includes the connections to and from the programmable logic element within the same tile, as shown by the examples included at the top of FIG. 7.

For example, a CLB 702 can include a programmable resource such as, e.g., a configurable logic element CLE 712 that can be programmed to implement user logic plus a single programmable interconnect element NT 711. A BRAM 703 can include a BRAM logic element (BRL 713) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 706 can include a DSP logic element (DSPL 714) in addition to an appropriate number of programmable interconnect elements. An IOB 704 can include, for example, two instances of an input/output logic element (IOL 715) in addition to one instance of the programmable interconnect element INT 711. As will be clear to those of skill in the art, the actual I/O pads connected, for example, to the I/O logic element 715 are manufactured using metal layered above the various illustrated logic blocks, and typically are not confined to the area of the input/output logic element 715.

In the pictured embodiment, a columnar area near the center of the die (shown shaded in FIG. 7) is used for configuration, clock, and other control logic. Horizontal areas 709 extending from this column are used to distribute the clocks and configuration signals across the breadth of the FPGA.

Some FPGAs utilizing the architecture illustrated in FIG. 7 include additional logic blocks that disrupt the regular columnar structure making up a large part of the FPGA. The additional logic blocks can be programmable blocks and/or dedicated logic. For example, the processor block PROC 710 shown in FIG. 7 spans several columns of CLBs and BRAMs.

Note that FIG. 7 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 7 are purely exemplary. For example, in an actual FPGA more than one adjacent column of CLBs is typically included wherever the CLBs appear, to facilitate the efficient implementation of user logic.

Those skilled in the art will appreciate that various alternative computing arrangements, including one or more processors and a memory arrangement configured with program code, would be suitable for hosting the processes and data structures of the different embodiments of the present invention.

Figure 8:
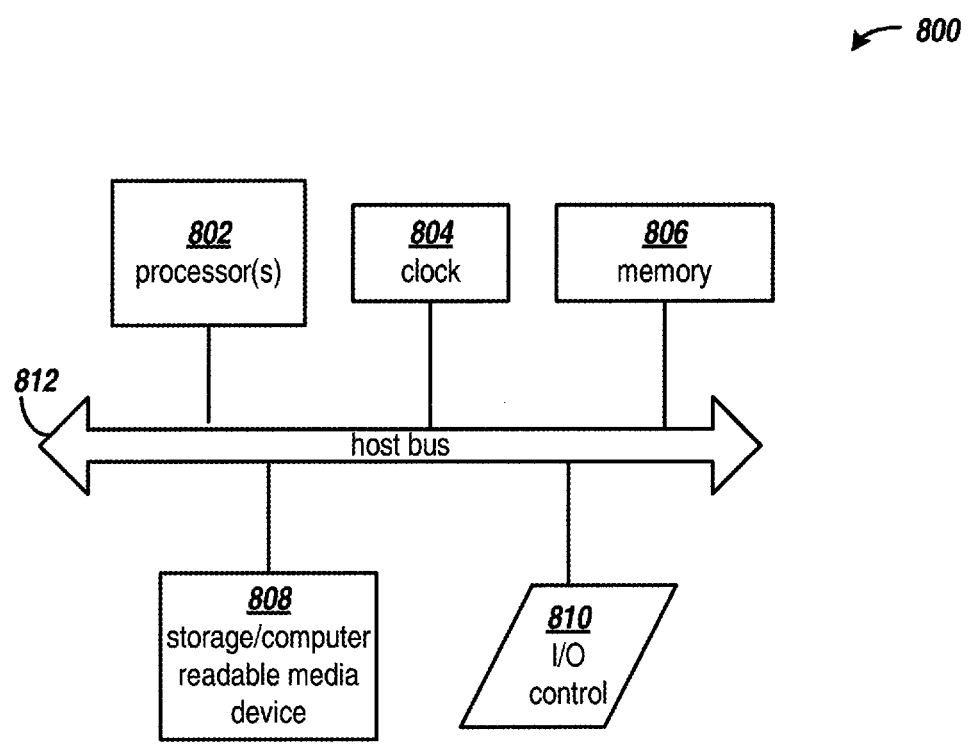
FIG. 8 illustrates a block diagram of a general purpose processor computing arrangement for implementing a data bus controller in accordance with various embodiments of the invention.

FIG. 8 is a block diagram of an example computing arrangement on which the processes described herein may be implemented using a general purpose processor. Those skilled in the art will appreciate that various alternative computing arrangements, including one or more processors and a memory arrangement configured with program code, would be suitable for hosting the processes and data structures and implementing the algorithms of one or more embodiments of the present invention. The computer code, comprising the processes of the present invention encoded in a processor executable format, may be stored and provided via a variety of computer-readable storage media or delivery channels such as magnetic or optical disks or tapes, electronic storage devices, or as application services over a network.

Processor computing arrangement 800 includes one or more processors 802, a clock signal generator 804, a memory unit 806, a storage unit 808, and an input/output control unit 810 coupled to host bus 812. The arrangement 800 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor 802 may be one or more general purpose processors, or a combination of one or more general purpose processors and suitable co-processors, or one or more specialized processors (e.g., RISC, CISC, pipelined, etc.).

The memory arrangement 806 typically includes multiple levels of cache memory and a main memory. The storage arrangement 808 may include local and/or remote persistent storage such as provided by magnetic disks (not shown), flash, EPROM, or other non-volatile data storage. The storage unit may be read or read/write capable. Further, the memory 806 and storage 808 may be combined in a single arrangement.

The processor arrangement 802 executes the software in storage 808 and/or memory 806 arrangements, reads data from and stores data to the storage 808 and/or memory 806 arrangements, and communicates with external devices through the input/output control arrangement 810. These functions are synchronized by the clock signal generator 804.

The resource of the computing arrangement may be managed by either an operating system (not shown), or a hardware control unit (not shown).

One or more embodiments of the present invention is thought to be applicable to a variety of devices and circuit designs implementing programmable logic. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for processing a circuit design, comprising:
    inputting delay-voltage data that describes a plurality of delay values, the delay values corresponding to operating voltage values of a target device;
    determining a delay scaling factor corresponding to a default gate-level delay of a target device and a maximum gate level delay at which the circuit design operates correctly;
    determining a voltage scaling factor corresponding to the delay scaling factor;
    synthesizing the circuit design, wherein the synthesized circuit design includes the voltage scaling factor, and the synthesized circuit design when implemented on the target device is configured and arranged to set an operating voltage to a value equal to a startup voltage value multiplied by the voltage scaling factor and cause the target device to exhibit the maximum gate-level delay for the circuit design, wherein the startup voltage value is stored in the target device;
    configuring a first target device and a second target device to implement the synthesized circuit design; and
    wherein:
        the first target device exhibits the default gate level delay when operated at a first startup voltage value stored in the first target device;
        the second target device exhibits the default gate level delay when operated at a second startup voltage stored in the second target device and different from the first startup voltage; and
    when configured to implement the synthesized design, the first and second target devices each operate at respective voltages equal to the respective first and second startup voltage values multiplied by the voltage scaling factor, causing the first and second target devices to each exhibit the maximum gate-level delay for the circuit design.

2. The method of claim 1, wherein the determining the maximum gate-level delay includes:
    determining whether a voltage value corresponding to the maximum gate-level delay in the delay-voltage data is within user-defined voltage constraints.

3. The method of claim 1, wherein determining a maximum gate-level delay includes determining whether a user-defined voltage scaling parameter scales the maximum gate-level delay to a selected delay value.

4. The method of claim 1, wherein determining a maximum gate-level delay includes determining whether a voltage value corresponding to the maximum gate-level delay in the delay-voltage data is equal to a user-defined operating voltage parameter.

5. The method of claim 1, further comprising:
determining maximum delay requirements of each path of the circuit design and performing place-and-route optimizations according to the maximum delay requirements of each path;
wherein the delay-voltage data further specifies respective delay parameters for areas of the target device.

6. The method of claim 1, wherein determining a maximum gate-level delay includes:
simulating the circuit design with a gate-level delay equal to the default delay;
verifying whether output of the simulation is correct; and
in response to verifying the output of the simulation is correct:
increasing the simulation delay by a selected amount; and
repeating simulation of the circuit design and verification of output using the increased simulation delay.

7. The method of claim 1, wherein determining a maximum gate-level delay includes:
simulating the circuit design with a supply voltage equal to the startup voltage;
verifying whether output of the simulation is correct;
in response to verifying the output of the simulation is correct:
decreasing the supply voltage by a selected amount; and
repeating simulation of the circuit design and verification of output using the decreased supply voltage;
determining a least supply voltage wherein simulation of the circuit design produced correct output; and
determining a gate-level delay of the simulation corresponding to the least supply voltage.

8. The method of claim 1, further comprising:
generating a bitstream from the synthesized circuit design;
wherein the bitstream is further configured to program the target device to set the operating voltage of the target device by signaling an external power supply.

9. A method for synthesis of a circuit design, the method comprising:
inputting delay-voltage data that describes a plurality of delay values corresponding to operating voltage values of a target device;
determining, by a processor, from analysis of the circuit design a maximum gate-level delay for the circuit design;
determining one of the operating voltage values corresponding to one of the plurality of delay values that is equivalent to the determined maximum gate-level delay;
determining a voltage scaling value based on the one of the operating voltage values and a startup voltage value of the target device, wherein the one of the operating voltage values is equal to the startup voltage value of the target device multiplied by the voltage scaling value; and
synthesizing the circuit design, wherein the synthesized circuit design specifies:
storing the voltage scaling value in a non-volatile memory; and
using the startup voltage value and the voltage scaling value, setting an operating voltage of a realized circuit of the synthesized circuit design to a value of the one of the operating voltage values;
configuring a first target device and a second target device to implement the synthesized circuit design; and
wherein:
the first target device exhibits a default gate level delay when operated at a first startup voltage value stored in the first target device;
the second target device exhibits the default gate level delay when operated at a second startup voltage stored in the second target device and different from the first startup voltage; and
when configured to implement the synthesized design, the first and second target devices each operate at respective voltages equal to the respective first and second startup voltage values multiplied by the voltage scaling value, causing the first and second target devices to each exhibit the maximum qate-level delay for the circuit design.

10. The method of claim 9, further comprising:
inputting a design constraint;
wherein the determining a maximum gate-level delay for the circuit design includes determining a maximum gate-level delay that meets the design constraint; and
wherein the synthesizing is performed in response to the determined one of the operating voltage values being less than or equal to the design constraint.

11. The method of claim 10, wherein the design constraint is a specific operating voltage.

12. The method of claim 10, wherein the design constraint is a maximum operating voltage.

13. The method of claim 10, wherein the design constraint is a maximum user-defined gate-level delay.

* * * * *